(12) United States Patent
Jiang et al.

(10) Patent No.: US 11,079,159 B2
(45) Date of Patent: Aug. 3, 2021

(54) REFRIGERATION AND FREEZING DEVICE

(71) Applicant: QINGDAO HAIER JOINT STOCK CO., LTD., Qingdao (CN)

(72) Inventors: Bo Jiang, Qingdao (CN); Lei Wang, Qingdao (CN); Haoquan Liu, Qingdao (CN); Ruowu Xin, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 214 days.

(21) Appl. No.: 16/466,287

(22) PCT Filed: Dec. 1, 2017

(86) PCT No.: PCT/CN2017/114249
§ 371 (c)(1),
(2) Date: Jun. 3, 2019

(87) PCT Pub. No.: WO2018/099471
PCT Pub. Date: Jun. 7, 2018

(65) Prior Publication Data
US 2020/0064051 A1 Feb. 27, 2020

(30) Foreign Application Priority Data
Dec. 2, 2016 (CN) .......................... 201611110820.1

(51) Int. Cl.
*F25D 17/04* (2006.01)
*B01D 53/22* (2006.01)
(Continued)

(52) U.S. Cl.
CPC ......... *F25D 17/045* (2013.01); *B01D 53/228* (2013.01); *C01B 13/0251* (2013.01);
(Continued)

(58) Field of Classification Search
CPC .... F25D 17/045; F25D 17/065; F25D 23/066; F25D 25/025; F25D 29/00;
(Continued)

(56) References Cited

U.S. PATENT DOCUMENTS

2016/0006091 A1* 1/2016 Schweinbenz ...... H01M 4/8626
429/405

FOREIGN PATENT DOCUMENTS

CN 2855946 Y * 1/2007
CN 101544356 A 9/2009
(Continued)

OTHER PUBLICATIONS

English Translation of JPH05227881a (Year: 1992).*
English Translation of JP2015-72103A (Year: 2013).*
English Translation of CN2855946Y (Year: 2007).*

*Primary Examiner* — David J Teitelbaum
(74) *Attorney, Agent, or Firm* — Cheng-Ju Chiang (57) ABSTRACT

The present invention provides a refrigeration and freezing device, including a case body, a door body, an oxygen-enrichment membrane assembly, an air pump, and a refrigeration system. For the refrigeration and freezing device, temperature within an appropriate storage range and a nitrogen-rich and oxygen-deficient atmosphere cooperate, thereby effectively extending the shelf life of foods.

9 Claims, 8 Drawing Sheets (51) Int. Cl.
  *C01B 13/02* (2006.01)
  *F25D 17/06* (2006.01)
  *F25D 23/06* (2006.01)
  *F25D 25/02* (2006.01)
  *F25D 29/00* (2006.01)

(52) U.S. Cl.
  CPC ......... *F25D 17/065* (2013.01); *F25D 23/066* (2013.01); *F25D 25/025* (2013.01); *F25D 29/00* (2013.01); *F25D 2317/041* (2013.01); *F25D 2700/12* (2013.01)

(58) Field of Classification Search
  CPC ........... F25D 2317/041; F25D 2700/12; B01D 53/228; C01B 13/0251
  See application file for complete search history.

(56) References Cited

FOREIGN PATENT DOCUMENTS

| | | | | |
|---|---|---|---|---|
| CN | 101766321 A | 7/2010 | | |
| CN | 106524645 A | 3/2017 | | |
| CN | 206514591 U | 9/2017 | | |
| JP | H05227881 A | * 2/1992 | ............. | F25D 23/00 |
| JP | H5-227881 A | 9/1993 | | |
| JP | 2015-72103 A | * 10/2013 | ............. | F25D 11/10 |
| KR | 10-2012-0049565 A | 5/2012 | | |

* cited by examiner

REFRIGERATION AND FREEZING DEVICE

CROSS-REFERENCE TO RELATED APPLICATION

The present application is a 35 U.S.C. § 371 National Phase conversion of International (PCT) Patent Application No. PCT/CN2017/114249, filed on Dec. 1, 2017, which claims priority of Chinese Patent Application No. CN201611110820.1, filed on Dec. 2, 2016 and titled "Refrigeration and freezing device", which is incorporated herein by reference in its entirety. The PCT International Patent Application was filed and published in Chinese.

TECHNICAL FIELD

The present invention relates to the field of item storage, and in particular, to a refrigeration and freezing device.

BACKGROUND

The society keeps developing, people's living standards become increasingly high, and the pace of people's life grows faster and faster. People often buy a large number of items and place the items in various refrigeration and freezing devices. However, when food such as leafy vegetables, fruits, and gourds are exposed to low temperature in a storage space in a refrigeration and freezing device, the skin of such food may be wrinkled and scarred, and the food may lose the original flavor and nutrition.

Generally, in a controlled-atmosphere preservation technology, an atmosphere (proportions of gas constituents or gas pressure) in an enclosed space around stored items is adjusted, so as to extend the shelf life of food. A basic principle of the technology is that in an enclosed space, various adjustments are made to obtain an atmosphere with constituents different from those of normal air, so as to suppress physiological and biochemical processes and microorganism activity that corrupt and deteriorate the stored items (usually food). Particularly, a controlled-atmosphere preservation technology in which the proportions of gas constituents are adjusted is specially discussed in this application.

It is known to all persons skilled in the art that constituents of normal air include (by volume percentage, the same below): about 78% nitrogen, about 21% oxygen, about 0.939% noble gases (helium, neon, argon, krypton, xenon, and radon), 0.031% carbon dioxide, and 0.03% other gases and impurities (for example, ozone, nitric oxide, nitrogen dioxide, water vapor, and the like). In the field of controlled-atmosphere preservation, nitrogen-rich gas is usually fed into an enclosed space to reduce the oxygen content to obtain a nitrogen-rich and oxygen-deficient preservative atmosphere. However, conventional nitrogen generation equipment applied to controlled-atmosphere preservation has a huge size and requires high costs. As a result, the technology is basically restricted to various large-scale specialized storage warehouses (the warehousing capacity is generally at least 30 tons) and is not suitable for home or individual users. In addition, a food preservation effect cannot be maximized by adjusting only the concentrations of nitrogen and oxygen.

SUMMARY

An object of the present invention is to enhance an effect of controlled-atmosphere preservation.

A further object of the present invention is to extend the shelf life of various food in a refrigeration and freezing device.

Particularly, the present invention provides a refrigeration and freezing device, the refrigeration and freezing device including: a case body, wherein a storage space and a compressor compartment are defined in the case body, a storage container is disposed in the storage space, and a freshness preservation space is defined inside the storage container; a door body, disposed on a front surface of the case body to close the storage space; an oxygen-enrichment membrane assembly disposed in the storage container, a space around the oxygen-enrichment membrane assembly being communicated with the freshness preservation space, wherein the oxygen-enrichment membrane assembly has at least one oxygen-enrichment membrane and an oxygen-rich gas collection cavity, and is configured to enable more oxygen than nitrogen in an airflow in the space around the oxygen-enrichment membrane assembly to enter the oxygen-rich gas collection cavity through the oxygen-enrichment membrane; an air pump, disposed in the compressor compartment, wherein an inlet end of the air pump is communicated with the oxygen-rich gas collection cavity of the oxygen-enrichment membrane assembly via a pipe, so as to discharge gas that enters the oxygen-rich gas collection cavity from the storage container; and a refrigeration system, configured to supply cooled air to the storage space, so as to keep an actual temperature in the freshness preservation space within a range between 0° C. and 10° C.

Optionally, the refrigeration and freezing device further includes: a temperature sensor, disposed in the freshness preservation space to monitor the actual temperature in the freshness preservation space.

Optionally, the refrigeration system includes: a compressor, a condenser, a throttling apparatus, and an evaporator, wherein the compressor is disposed in the compressor compartment.

Optionally, the case body includes: a liner, wherein the storage space is defined in the liner.

Optionally, the refrigeration and freezing device is a direct-cooling refrigerator, and the evaporator is disposed on an outer side or an inner side of a rear wall surface of the liner.

Optionally, the refrigeration system is further configured to adjust an operation state of the compressor, so as to keep the actual temperature in the freshness preservation space within the range between 0° C. and 10° C.

Optionally, the refrigeration and freezing device is an air-cooling refrigerator, an evaporator chamber for accommodating the evaporator is disposed inside the case body, an air duct from the evaporator chamber to the freshness preservation space is defined on the back of the liner, and an air door is disposed on the air duct to adjust a volume of cold air delivered to the freshness preservation space.

Optionally, the refrigeration system is further configured to adjust an operation state of the compressor and/or the opening or closing of the air door, so as to keep the actual temperature in the freshness preservation space within the range between 0° C. and 10° C.

Optionally, the storage container is a sealed drawer, and the sealed drawer defines the freshness preservation space; and the sealed drawer includes: a drawer holder having a front opening and fixed at the liner, wherein the freshness preservation space is defined in the drawer holder; and a drawer body, slidably mounted in the drawer holder, so as to be operably pulled out or pushed in the drawer holder at the front opening of the drawer holder.

Optionally, the oxygen-enrichment membrane assembly further includes a support frame having a first surface and a second surface parallel to each other, wherein a plurality of airflow channels respectively extending on the first surface, extending on the second surface, and passing through the support frame to communicate the first surface with the second surface is formed on the support frame, and the plurality of airflow channels together forms the oxygen-rich gas collection cavity; and the at least one oxygen-enrichment membrane is two planar oxygen-enrichment membranes respectively laid on the first surface and the second surface of the support frame.

The refrigeration and freezing device of the present invention has the oxygen-enrichment membrane assembly and the air pump, wherein a space around the oxygen-enrichment membrane assembly is communicated with the freshness preservation space; the oxygen-enrichment membrane assembly has the at least one oxygen-enrichment membrane and the oxygen-rich gas collection cavity, and is configured to enable more oxygen than nitrogen in an airflow in the space around the oxygen-enrichment membrane assembly to enter the oxygen-rich gas collection cavity through the oxygen-enrichment membrane; and the air pump may discharge gas that enters the oxygen-rich gas collection cavity from the storage container, so as to obtain a nitrogen-rich and oxygen-deficient atmosphere beneficial to food preservation in the freshness preservation space. The refrigeration system of the refrigeration and freezing device is configured to supply cooled air to the storage space, so as to keep a temperature in the freshness preservation space within a range between 0° C. and 10° C. The temperature within this range and the nitrogen-rich and oxygen-deficient atmosphere cooperate to suppress respiration rates of food in the freshness preservation space, thereby effectively extending the shelf life of the food.

Further, for the refrigeration and freezing device of the present invention, the temperature sensor disposed in the freshness preservation space monitors an actual temperature in the freshness preservation space. When the actual temperature in the freshness preservation space is not within the range of temperature between 0° C. and 10° C., if the refrigeration and freezing device is a direct-cooling refrigerator, an operation state of the compressor may be adjusted; or if the refrigeration and freezing device is an air-cooling refrigerator, an operation state of the compressor and/or the opening or closing of the air door may be adjusted, so as to ensure that the actual temperature in the freshness preservation space is kept within an interval of temperature that enhances an effect of controlled-atmosphere preservation. The interval of temperature may be further divided for different types of food, so as to enable the actual temperature in the freshness preservation space to better satisfy preservation requirements of the different types of food, thereby further enhancing a food preservation effect.

The foregoing and other objects, advantages, and features of the present invention will become apparent from the following detailed description of the specific embodiments of the present invention with reference to the accompanying drawings.

BRIEF DESCRIPTION OF THE DRAWINGS

Some specific embodiments of the present invention will be described below in detail with reference to the accompanying drawings in an exemplary manner rather than a limitative manner. The same reference numerals in the accompanying drawings represent the same or similar components or parts. Persons skilled in the art should understand that these accompanying drawings are not necessarily drawn to scale. In the accompanying drawings.

DETAILED DESCRIPTION

Figure 1:
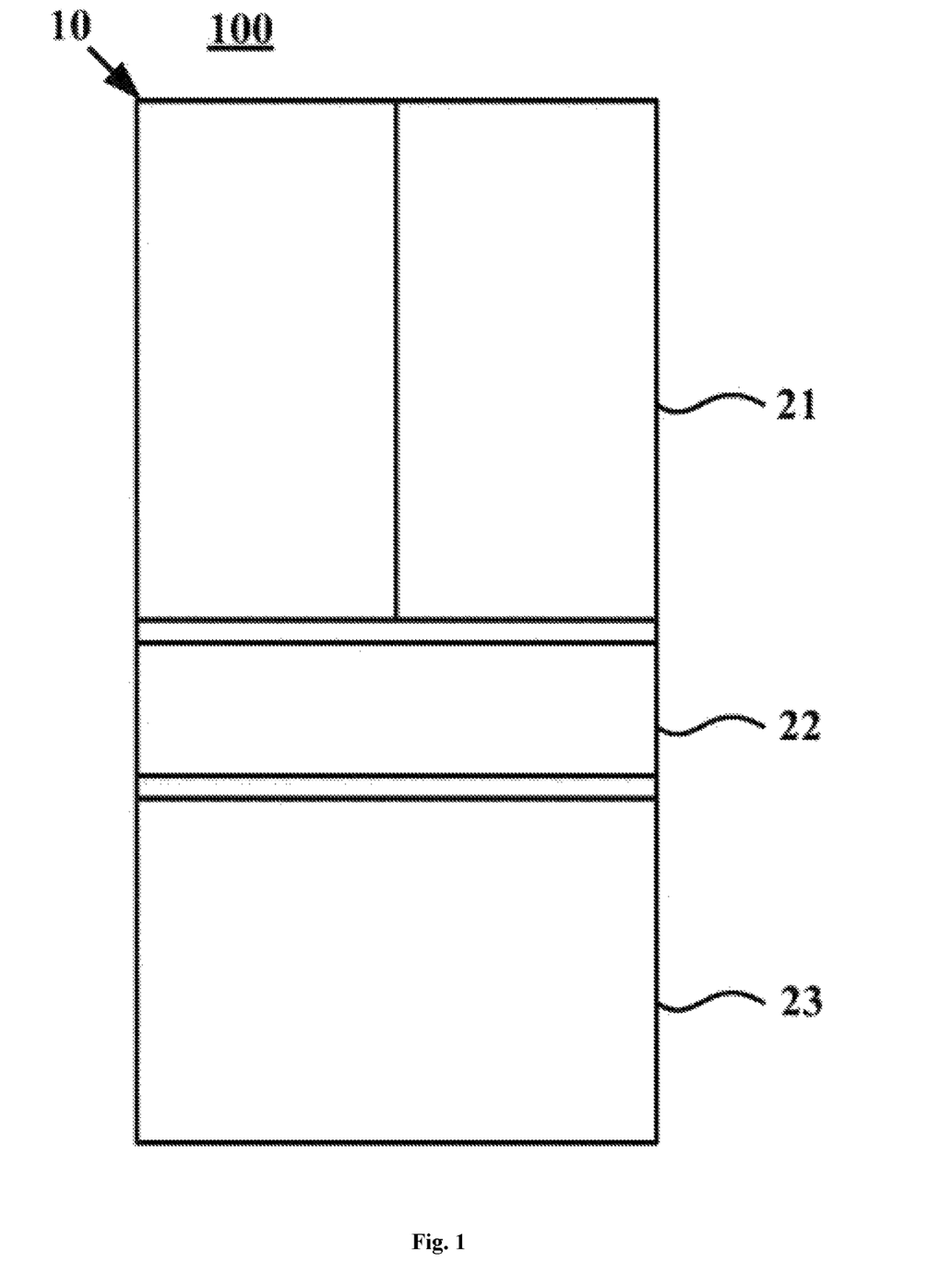
FIG. 1 is a schematic structural diagram of a refrigeration and freezing device according to an embodiment of the present invention.
Figure 2:
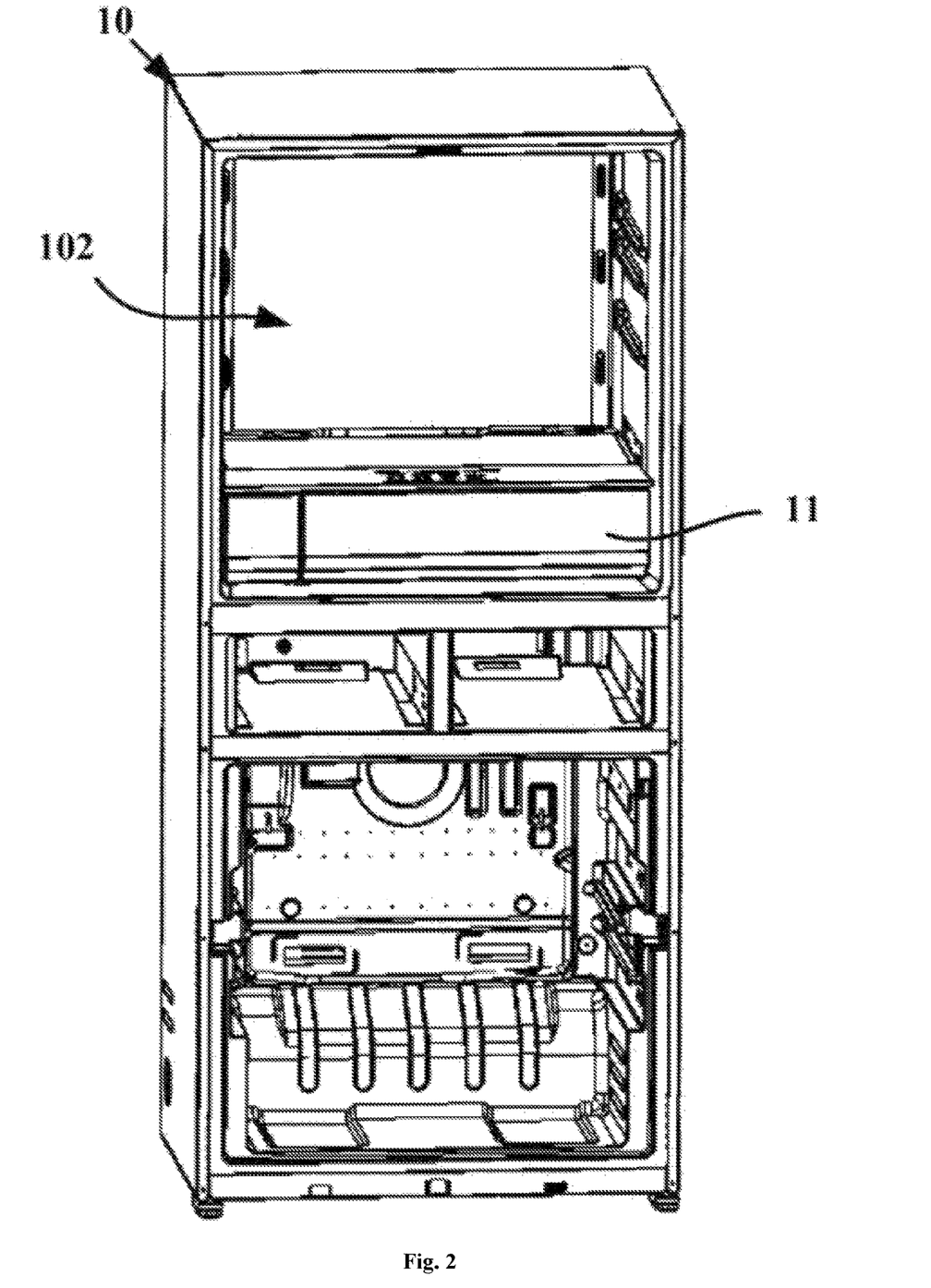
FIG. 2 is a partial schematic structural diagram of a refrigeration and freezing device according to an embodiment of the present invention.
Figure 3:
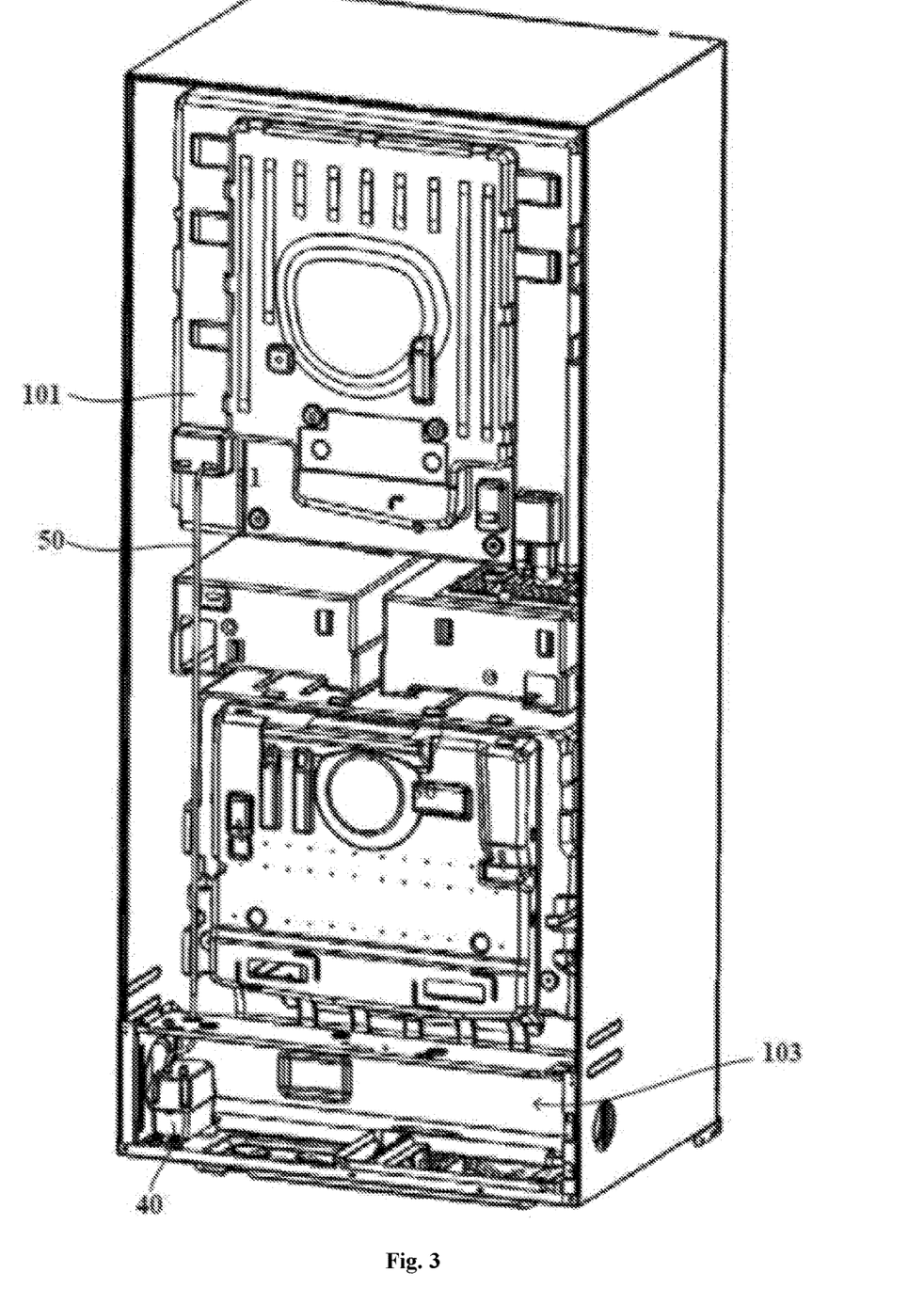
FIG. 3 is a schematic structural diagram of the structure shown in FIG. 2 from another viewing angle.

Embodiments of the present invention provide a refrigeration and freezing device. A nitrogen-rich and oxygen-deficient atmosphere and a temperature within an appropriate storage range cooperate to suppress respiration rates of food in a freshness preservation space, thereby effectively extending the shelf life of the food. The refrigeration and freezing device may be a refrigerator, a freezer, and the like. FIG. 1 is a schematic structural diagram of a refrigeration and freezing device 100 according to an embodiment of the present invention. FIG. 2 is a partial schematic structural diagram of the refrigeration and freezing device 100 according to an embodiment of the present invention. FIG. 3 is a schematic structural diagram of the structure shown in FIG. 2 from another viewing angle. The refrigeration and freezing device 100 in this embodiment may generally include a case body 10, a door body, an oxygen-enrichment membrane assembly 31, an air pump 40, and a refrigeration system.

A storage space 102 and a compressor compartment 103 are defined in the case body 10. The quantity of the storage spaces 102 and the structure of the storage space 102 may be configured as required. FIG. 1 shows a case of a first space, a second space, and a third space that are disposed vertically in sequence. The spaces may be configured as a refrigerating space, a freezing space, a variable-temperature space, and a freshness preservation space based on different uses. Each storage space may be divided by a partition board into a plurality of storage regions, and a shelf or drawer is used to store items. A storage container may be disposed in the storage space 102, and a freshness preservation space is defined inside the storage container.

The door body is disposed on a front surface of the case body 10 to close the storage space 102. The door body may be disposed corresponding to the storage space. That is, each storage space corresponds to one or more door bodies. The quantity of the storage spaces, the quantity of the door bodies, and the function of the storage space may be actually selected based on a specific case. For the refrigeration and freezing device 100 in this embodiment, corresponding to the first space, the second space, and the third space that are disposed vertically in sequence, a first door body 21, a second door body 22, and a third door body 23 are disposed respectively. The door body may be pivotally disposed on the front surface of the case body or may be opened by using a drawer to implement a drawer storage space. A metal slide rail is usually disposed for the drawer storage space, so that it can be ensured that the drawer is opened or closed smoothly, and noise can be reduced. For the refrigeration and freezing device 100 in this embodiment, a pivotal door is used for the first space, and drawer doors are used for the second space and the third space.

As shown in FIG. 2, the storage container may be a sealed drawer 11, and the sealed drawer 11 defines the freshness preservation space. In some optional embodiments, the freshness preservation space may be defined by a sealed box, a sealed jar, a sealed case or the like.

Figure 4:
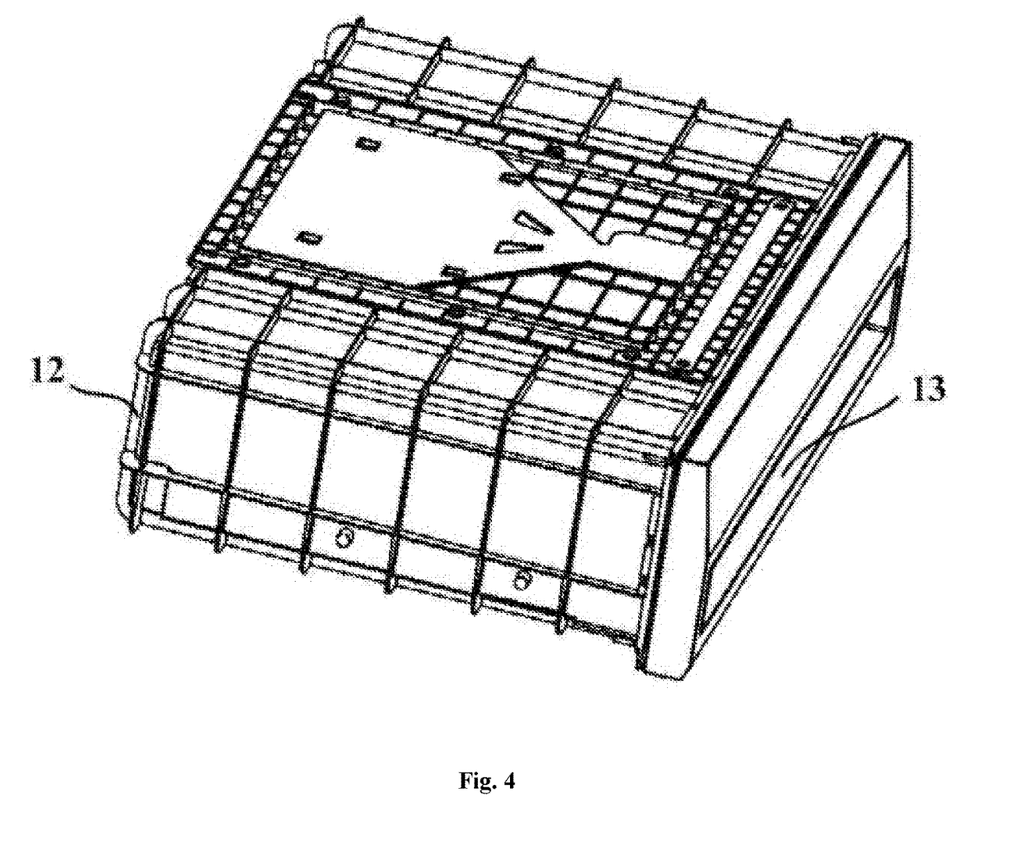
FIG. 4 is a schematic structural diagram of a sealed drawer in a refrigeration and freezing device according to an embodiment of the present invention.

As shown in FIG. 3, the case body 10 may include a liner 101. The storage space 102 is defined in the liner 101. FIG. 4 is a schematic structural diagram of the sealed drawer 11 in the refrigeration and freezing device 100 according to an embodiment of the present invention. As shown in FIG. 4, the sealed drawer 11 includes: a drawer holder 12 having a front opening and fixed at the liner 101, wherein the freshness preservation space is defined in the drawer holder 12; and a drawer body 13, slidably mounted in the drawer holder 12, so as to be operably pulled out or pushed in the drawer holder 12 at the front opening of the drawer holder 12. The drawer holder 12 may be disposed at a lower portion of the liner. In some other embodiments, the drawer holder 12 may be disposed at a middle portion or an upper portion of the liner. In this embodiment, the liner 101 and the drawer holder 12 may be integrally formed, or may be separately formed and then assembled.

A plurality of air pressure balance holes may be formed in the drawer holder 12 to communicate the storage space 102 with the freshness preservation space. Each air pressure balance hole may be millimeter-level pores. For example, the diameter of each air pressure balance hole may be between 0.1 mm and 3 mm. When the plurality of air pressure balance holes is formed, pressure inside and outside the freshness preservation space may be balanced. With the plurality of air pressure balance holes, gas in the freshness preservation space will not flow to a larger storage space; or even the gas flows, the flow is negligible and does not adversely affect the preservation of food in the freshness preservation space. In some other embodiments, the air pressure balance holes may be not formed in the drawer holder 12. Even so, there is still a large amount of gas in the freshness preservation space. For example, there is nitrogen in the freshness preservation space, and a user can pull out the drawer body 13 much more easily as compared with an existing vacuum storage chamber.

Figure 5:
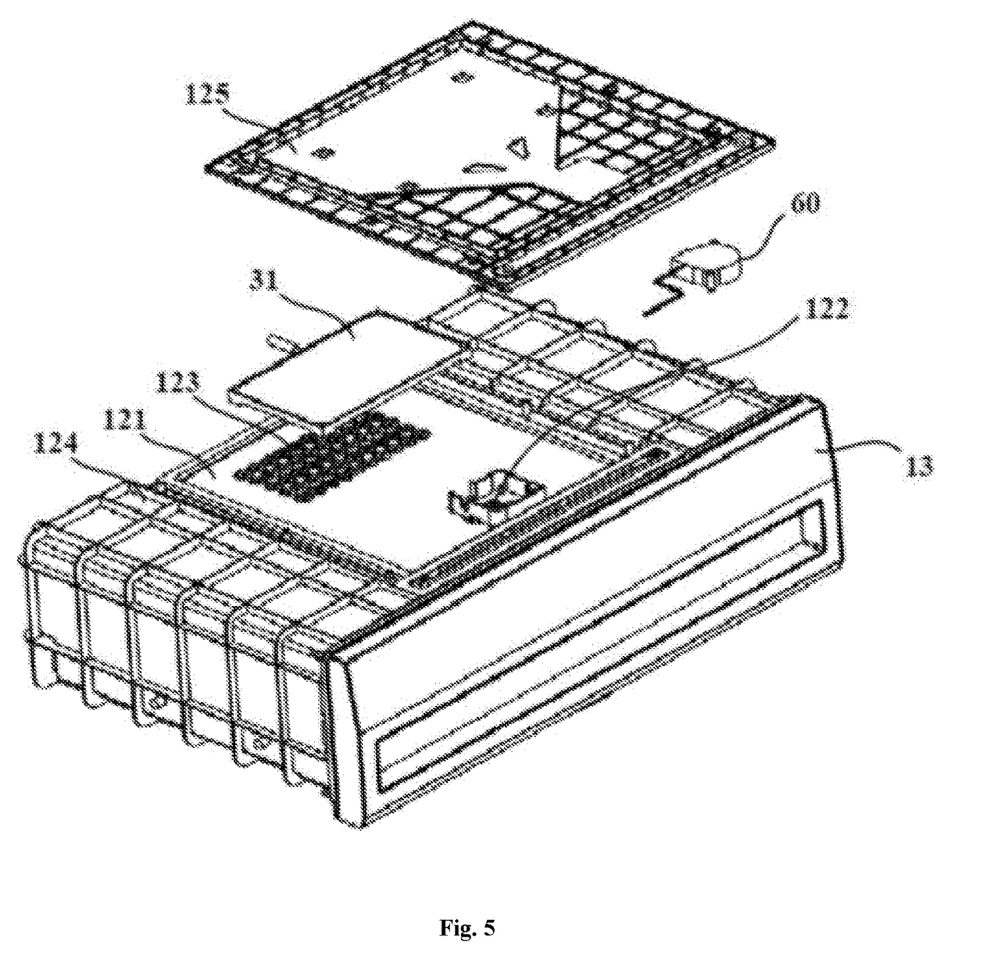
FIG. 5 is a schematic exploded view of the sealed drawer shown in FIG. 4.

FIG. 5 is a schematic exploded view of the sealed drawer shown in FIG. 4. The oxygen-enrichment membrane assembly 31 is mounted at the storage container, and may be mounted at the sealed drawer in this embodiment, and a space around the oxygen-enrichment membrane assembly 31 is communicated with the freshness preservation space. As shown in FIG. 5, the oxygen-enrichment membrane assembly 31 may be disposed on the drawer holder 12, and is preferably disposed on a top wall of the drawer holder 12. Specifically, an accommodating cavity 121 communicated with the freshness preservation space is disposed in the top wall of the drawer holder 12 to accommodate the oxygen-enrichment membrane assembly 31. At least one first vent hole 122 and at least one second vent hole 123 separated from the at least one first vent hole 122 are formed in a wall surface between the accommodating cavity 121 of the top wall of the drawer holder 12 and the freshness preservation space to respectively communicate the accommodating cavity 121 with the freshness preservation space at different positions. The first vent hole 122 and the second vent hole 123 are both small holes, and there may be a plurality of first vent holes 122 and a plurality of second vent holes 123. In some alternative embodiments, a sunk groove is provided on an inner side of the top wall of the drawer holder 12. The oxygen-enrichment membrane assembly 31 is disposed in the sunk groove on the top wall of the drawer holder 12.

In some embodiments of the present invention, to enable gas in the freshness preservation space and the accommodating cavity 121 to flow, the refrigeration and freezing device 100 may further include a fan 60, disposed in the accommodating cavity 121, so as to enable the gas in the freshness preservation space to sequentially flow through the at least one first vent hole 122, the accommodating cavity 121, and the at least one second vent hole 123 to return to the freshness preservation space. The fan 60 is preferably a centrifugal fan, disposed at the first vent hole 122 in the accommodating cavity 121. That is, the centrifugal fan is located above the at least one first vent hole 122, a rotation axis of the centrifugal fan faces downwards vertically, and an air inlet of the centrifugal fan is right opposite the first vent hole 122. An air outlet of the centrifugal fan may face the oxygen-enrichment membrane assembly 31. The oxygen-enrichment membrane assembly 31 is disposed above the at least one second vent hole 123; and each oxygen-enrichment membrane of the oxygen-enrichment membrane assembly 31 is parallel to the top wall of the drawer holder 12. The at least one first vent hole 122 is formed in a front portion of the top wall, and the at least one second vent hole 123 is formed in a rear portion of the top wall. That is, the centrifugal fan is disposed at a front portion of the accommodating cavity 121, and the oxygen-enrichment membrane assembly 31 is disposed at a rear portion of the accommodating cavity 121.

Further, the top wall of the drawer holder 12 includes a lower plate portion 124 and a cover plate portion 125. A sunk portion is formed in a partial region of the lower plate portion 124. The cover plate portion 125 detachably covers the concave portion to form the accommodating cavity 121. To facilitate the fabrication of the drawer holder 12, the lower plate portion 124 may be integrally formed with a side wall, a bottom wall, and a rear wall of the drawer holder 12.

The oxygen-enrichment membrane assembly 31 has at least one oxygen-enrichment membrane and an oxygen-rich gas collection cavity, and is configured to enable more oxygen than nitrogen in an airflow in the space around the oxygen-enrichment membrane assembly 31 to enter the oxygen-rich gas collection cavity through the oxygen-enrichment membrane.

The air pump 40 is disposed in the compressor compartment 103. An inlet end of the air pump 40 is communicated with the oxygen-rich gas collection cavity of the oxygen-enrichment membrane assembly 31 via a pipe 50, so as to discharge gas that enters the oxygen-rich gas collection cavity from the storage container, thereby obtaining a nitrogen-rich and oxygen-deficient atmosphere beneficial to food preservation in the freshness preservation space.

The refrigeration system is configured to supply cooled air to the storage space, so as to keep an actual temperature in the freshness preservation space within a range between 0° C. and 10° C. The temperature within this range and the nitrogen-rich and oxygen-deficient atmosphere cooperate to suppress respiration rates of food in the freshness preservation space, thereby effectively extending the shelf life of the food.

After performing a plurality of experiments, the inventor finds that temperature significantly affects respiration effects of food. In the freshness preservation space, after the nitrogen-rich and oxygen-deficient atmosphere has been adjusted, the adjustment of temperature is significant in extending the shelf life of food. For example, equal shares of a food are separately placed in freshness preservation spaces having the same atmosphere but different temperatures. Gas in the freshness preservation spaces is sampled and analyzed every day. In a freshness preservation space with a higher temperature, the oxygen content decreases at a faster rate, and the carbon dioxide content increases at a faster rate. That is, a respiration rate of the food increases as the temperature rises. Thus, a respiration effect of the food can be effectively suppressed at a low temperature. In addition, in the nitrogen-rich and oxygen-deficient atmosphere, a range of appropriate storage temperature of the food is between 0° C. and 10° C. In a preferred embodiment, an interval of appropriate storage temperature may be further divided for different food. For example, the interval of appropriate storage temperature may be 2° C. to 8° C. for fruit or vegetable food, and a refrigerating temperature for cold and fresh meat food is generally 0° C. to 2° C. It should be noted that the foregoing specific values of storage temperature are only examples but are not intended to limit the present invention.

The refrigeration and freezing device 100 may further include: a temperature sensor, disposed in the freshness preservation space to monitor the actual temperature in the freshness preservation space. When the actual temperature in the freshness preservation space is not in the range between 0° C. and 10° C., an operation state of the refrigeration system may be adjusted to adjust the actual temperature in the freshness preservation space.

Specifically, the refrigeration system includes a compressor, a condenser, a throttling apparatus, and an evaporator. The compressor is disposed in the compressor compartment 103. If the refrigeration and freezing device is a direct-cooling refrigerator, the evaporator is disposed on an outer side or an inner side of a rear wall surface of the liner. The refrigeration system is further configured to adjust an operation state of the compressor, so as to keep the actual temperature in the freshness preservation space within the range between 0° C. and 10° C. If the refrigeration and freezing device is an air-cooling refrigerator, an evaporator chamber for accommodating the evaporator is disposed inside the case body; an air duct from the evaporator chamber to the freshness preservation space is defined on the back of the liner; and an air door is disposed on the air duct to adjust a volume of cold air delivered to the freshness preservation space. The refrigeration system is further configured to adjust an operation state of the compressor and/or the opening or closing of the air door, so as to keep the actual temperature in the freshness preservation space within the range between 0° C. and 10° C. When only the proportions of nitrogen and oxygen in the freshness preservation space are adjusted to obtain the nitrogen-rich and oxygen-deficient atmosphere, a food preservation requirement cannot be fully satisfied. In this embodiment, the range of temperature between 0° C. and 10° C. is restricted for the freshness preservation space with the nitrogen-rich and oxygen-deficient atmosphere. Within the range of appropriate storage temperature, respiration effects of food in the freshness preservation space can be effectively suppressed, thereby extending the shelf life of the food.

Figure 6:
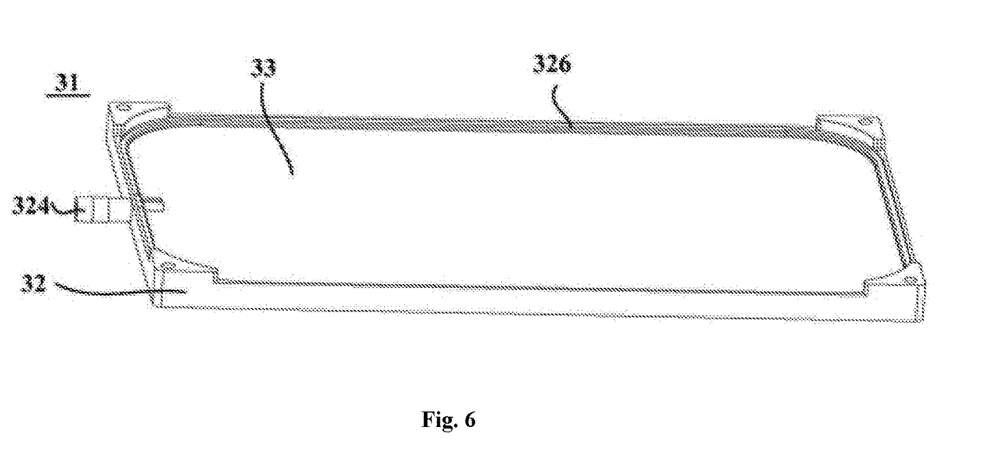
FIG. 6 is a schematic structural diagram of an oxygen-enrichment membrane assembly in a refrigeration and freezing device according to an embodiment of the present invention.
Figure 7:
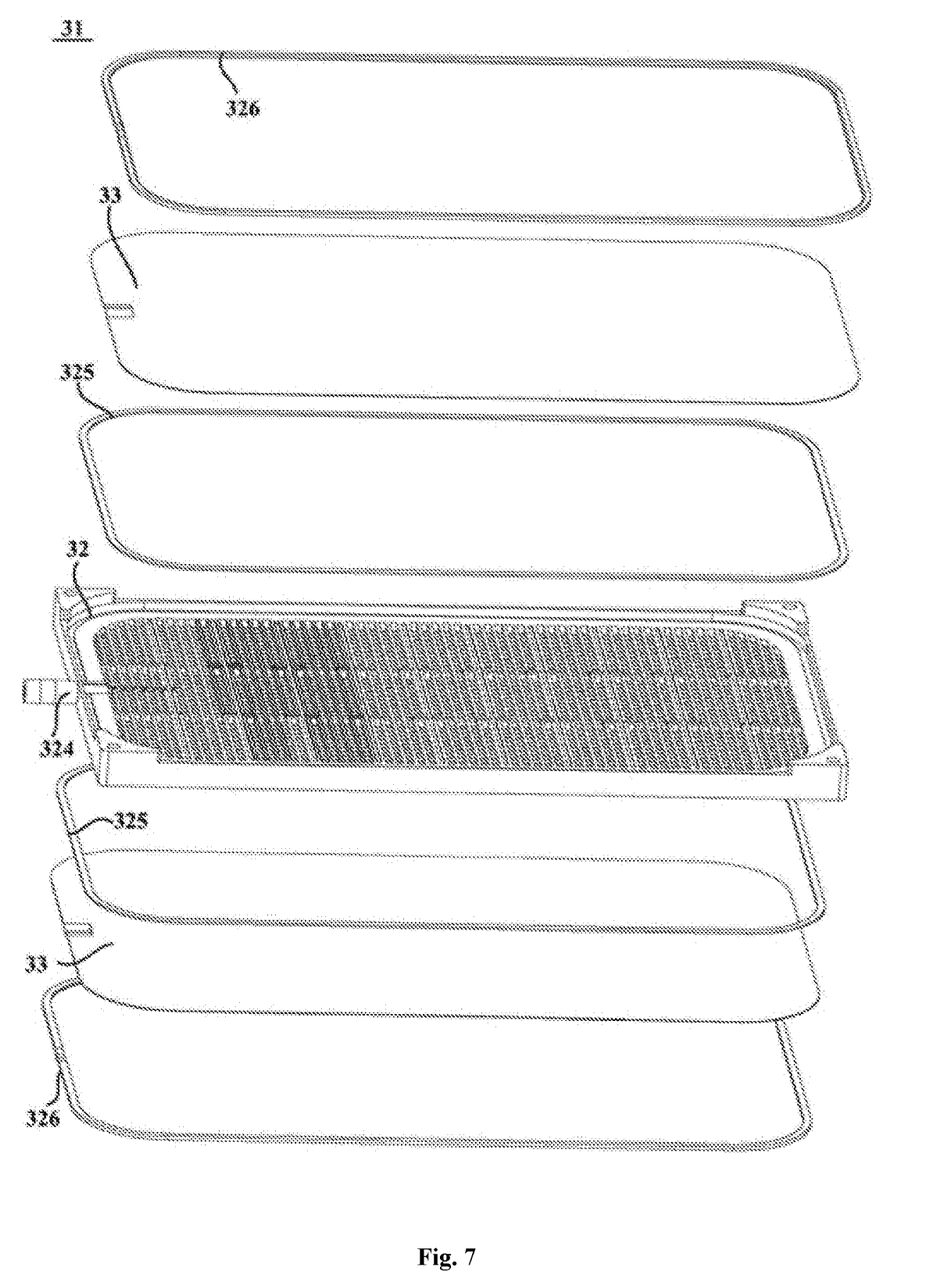
FIG. 7 is a schematic exploded view of the oxygen-enrichment membrane assembly shown in FIG. 6.
Figure 8:
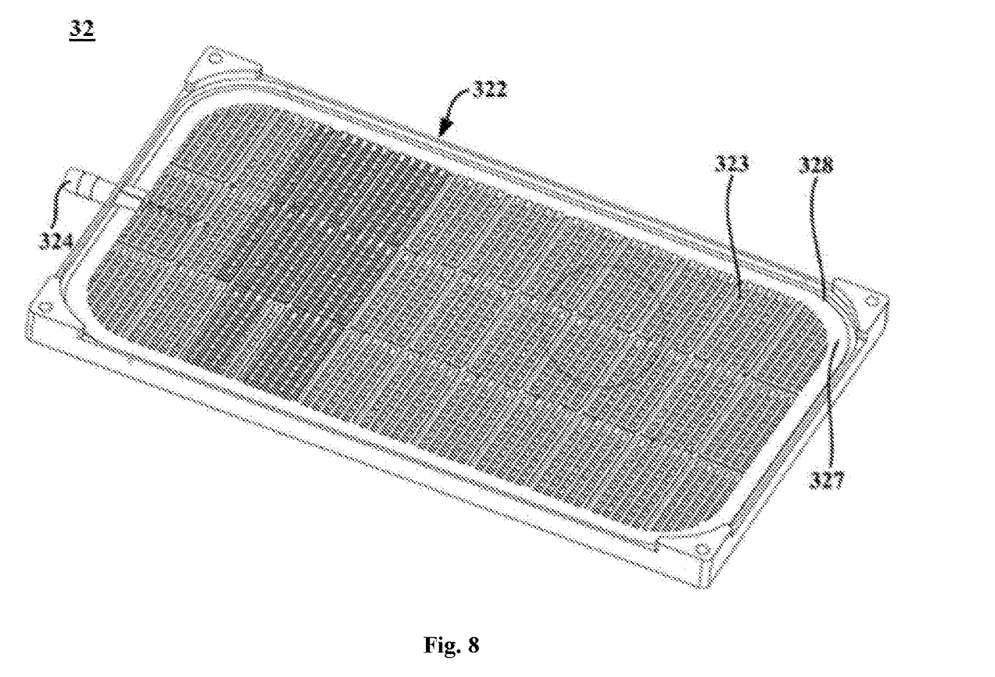
FIG. 8 is a schematic structural diagram of a support frame of the oxygen-enrichment membrane assembly shown in FIG. 7.
Figure 9:
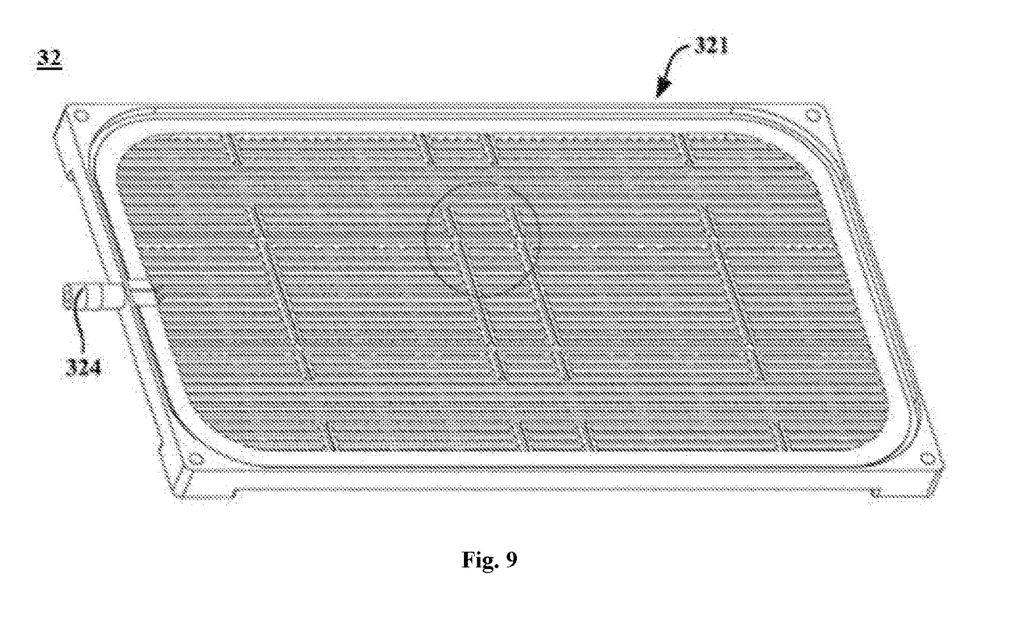
FIG. 9 is a schematic structural diagram of a support frame of the oxygen-enrichment membrane assembly shown in FIG. 7 observed from another angle.

FIG. 6 is a schematic structural diagram of the oxygen-enrichment membrane assembly 31 in the refrigeration and freezing device 100 according to an embodiment of the present invention. FIG. 7 is a schematic exploded view of the oxygen-enrichment membrane assembly 31 shown in FIG. 6. FIG. 8 is a schematic structural diagram of a support frame 32 in the oxygen-enrichment membrane assembly 31 shown in FIG. 7. FIG. 9 is a schematic structural diagram of the support frame 32 in the oxygen-enrichment membrane assembly 31 shown in FIG. 7 observed from another angle.

As shown in FIG. 6 to FIG. 9, the oxygen-enrichment membrane assembly 31 includes the support frame 32. The support frame 32 has a first surface 321 and a second surface 322 parallel to each other. A plurality of airflow channels 323 respectively extending on the first surface 321, extending on the second surface 322, and passing through the support frame 32 to communicate the first surface 321 with the second surface 322 is formed on the support frame 32. The plurality of airflow channels 323 together forms the oxygen-rich gas collection cavity. There is at least one oxygen-enrichment membrane 33 in this embodiment. Preferably, there may be two planar oxygen-enrichment membranes respectively laid on the first surface 321 and the second surface 322 of the support frame 32. When a pressure on an inner side of the oxygen-enrichment membrane 33 is lower than a pressure on an outer side of the oxygen-enrichment membrane 33, the oxygen-enrichment membrane 33 may allow oxygen in air on the outer side of the oxygen-enrichment membrane 33 to enter the oxygen-rich gas collection cavity through the oxygen-enrichment membrane 33 to form oxygen-rich gas, so that the air on the outer side of the oxygen-enrichment membrane 33 is nitrogen-rich gas.

In some embodiments, the support frame 32 includes a gas extraction hole 324 communicated with at least one of the plurality of airflow channels 323 to allow the oxygen-rich gas in the oxygen-rich gas collection cavity to be extracted by the air pump 40. As the oxygen-rich gas in the oxygen-rich gas collection cavity is extracted, there is a negative pressure state in the oxygen-rich gas collection cavity. Therefore, oxygen in air on an outer side of the oxygen-enrichment membrane assembly 31 keeps entering the oxygen-rich gas collection cavity through the oxygen-enrichment membrane 33, so that a nitrogen-rich atmosphere is formed in the air on the outer side of the oxygen-enrichment membrane assembly 31. In some embodiments, the plurality of airflow channels 323 formed inside the support frame 32 may be a plurality of hollow cavities communicated with the gas extraction hole 324.

In some embodiments, referring to FIG. 7 and FIG. 8, to further facilitate mounting, a loop of double-sided adhesive tape 325 may be first used to prefix the oxygen-enrichment membrane 33 in a mounting groove 327 of the support frame 32. A loop of sealant 326 is then filled in an annular cord groove 328 of the support frame 32, so as to mount the oxygen-enrichment membrane 33 in the mounting groove 327 of the support frame 32 in a sealed manner.

For the oxygen-enrichment membrane assembly, constituent gases in air pass through the oxygen-enrichment membrane at different permeation rates. Driven by a pressure difference, oxygen in the air first passes through the oxygen-enrichment membrane to obtain oxygen. In some other embodiments, a hollow fiber membrane assembly may further be used to implement the nitrogen-rich and oxygen-deficient atmosphere in the freshness preservation space. For the hollow fiber membrane assembly, constituent gases in air have different permeability for a hollow fiber membrane. Because an oxygen molecule is smaller than a nitrogen molecule, oxygen molecules first pass through the hollow fiber membrane to obtain oxygen.

The air pump 40 in this embodiment may be disposed at one end of the compressor compartment 103, and the compressor may be disposed at the other end of the compressor compartment 103, so that the air pump 40 is relatively far away from the compressor to reduce noise superposition and waste heat superposition. For example, the air pump 40 may be disposed at end, close to a pivotal side of the door body, of the compressor compartment 103. When the refrigeration and freezing device is a side-by-side refrigerator, the air pump 40 may be disposed at any end of the compressor compartment 103. In some other embodiments of the present invention, the air pump 40 is disposed close to the compressor, is disposed at an end of the compressor compartment 103, and is located between the compressor and a side wall of the compressor compartment 103. When the air pump 40 is disposed in the compressor compartment 103, a space in the compressor compartment 103 may be fully used, and no additional space is occupied. Therefore, no additional size is required for the refrigeration and freezing device, so that the refrigeration and freezing device can have a compact structure.

The refrigeration and freezing device 100 in this embodiment has the oxygen-enrichment membrane assembly 31 and the air pump 40. A space around the oxygen-enrichment membrane assembly 31 is communicated with the freshness preservation space. The oxygen-enrichment membrane assembly 31 has the at least one oxygen-enrichment membrane and the oxygen-rich gas collection cavity, and is configured to enable more oxygen than nitrogen in an airflow in the space around the oxygen-enrichment membrane assembly 31 to enter the oxygen-rich gas collection cavity through the oxygen-enrichment membrane. The air pump 40 may discharge gas that enters the oxygen-rich gas collection cavity from the storage container, so as to obtain a nitrogen-rich and oxygen-deficient atmosphere beneficial to food preservation in the freshness preservation space. The refrigeration system of the refrigeration and freezing device is configured to supply cooled air to the storage space, so as to keep a temperature in the freshness preservation space within a range between 0° C. and 10° C. The temperature within this range and the nitrogen-rich and oxygen-deficient atmosphere cooperate to suppress respiration rates of food in the freshness preservation space, thereby effectively extending the shelf life of the food.

Further, for the refrigeration and freezing device 100 in this embodiment, the temperature sensor disposed in the freshness preservation space monitors an actual temperature in the freshness preservation space. When the actual temperature in the freshness preservation space is not within the range of temperature between 0° C. and 10° C., if the refrigeration and freezing device is a direct-cooling refrigerator, an operation state of the compressor may be adjusted; or if the refrigeration and freezing device is an air-cooling refrigerator, an operation state of the compressor and/or the opening or closing of the air door may be adjusted, so as to ensure that the actual temperature in the freshness preservation space is kept within an interval of temperature that enhances an effect of controlled-atmosphere preservation. The interval of temperature may be further divided for different types of food, so as to enable the actual temperature in the freshness preservation space to better satisfy preservation requirements of the different types of food, thereby further enhancing a food preservation effect.

Here, persons skilled in the art should be aware that although a plurality of exemplary embodiments of the present invention has been shown and described herein, many other variations or modifications conforming to the principle of the present invention may still be directly determined or derived according to the content disclosed in the present invention without departing from the spirit and scope of the present invention. Therefore, all these other variations or changes should be construed and determined as falling within the scope of the present invention.

What is claimed is:

1. A refrigeration and freezing device, comprising:
a case body, wherein a storage space and a compressor compartment are defined in the case body, a storage container is disposed in the storage space, and a freshness preservation space is defined inside the storage container;
a door body, disposed on a front surface of the case body to close the storage space;
an oxygen-enrichment membrane assembly disposed at the storage container, a space around the oxygen-enrichment membrane assembly being communicated with the freshness preservation space, wherein the oxygen-enrichment membrane assembly has at least one oxygen-enrichment membrane and an oxygen-rich gas collection cavity, and is configured to enable more oxygen than nitrogen in an airflow in the space around the oxygen-enrichment membrane assembly to enter the oxygen-rich gas collection cavity through the oxygen-enrichment membrane;
an air pump, disposed in the compressor compartment, wherein an inlet end of the air pump is communicated with the oxygen-rich gas collection cavity of the oxygen-enrichment membrane assembly via a pipe, so as to discharge gas that enters the oxygen-rich gas collection cavity from the storage container; and
a refrigeration system, configured to supply cooled air to the storage space, so as to keep an actual temperature in the freshness preservation space within a range between 0° C. and 10° C.;
the oxygen-enrichment membrane assembly further comprises a support frame having a first surface and a second surface parallel to each other, wherein a plurality of airflow channels respectively extending on the first surface, extending on the second surface, and passing through the support frame to communicate the first surface with the second surface is formed on the support frame, and the plurality of airflow channels together forms the oxygen-rich gas collection cavity; and
the at least one oxygen-enrichment membrane is two planar oxygen-enrichment membranes respectively laid on the first surface and the second surface of the support frame, the at least one oxygen-enrichment membrane allows oxygen in air on an outer side of the at least one oxygen-enrichment membrane to enter the oxygen-rich gas collection cavity through the at least one oxygen-enrichment membrane to form oxygen-rich gas, so that the air on the outer side of the at least one oxygen-enrichment membrane is nitrogen-rich gas.

2. The refrigeration and freezing device according to claim 1, wherein the refrigeration and freezing device further comprises:

a temperature sensor disposed in the freshness preservation space to monitor the actual temperature in the freshness preservation space.

3. The refrigeration and freezing device according to claim 1, wherein the refrigeration system comprises:

a compressor, a condenser, a throttling apparatus, and an evaporator, wherein the compressor is disposed in the compressor compartment.

4. The refrigeration and freezing device according to claim 3, wherein the case body comprises:

a liner, wherein the storage space is defined in the liner.

5. The refrigeration and freezing device according to claim 4, wherein the refrigeration and freezing device is a direct-cooling refrigerator, and the evaporator is disposed on an outer side or an inner side of a rear wall surface of the liner.

6. The refrigeration and freezing device according to claim 5, wherein the refrigeration system is further configured to adjust an operation state of the compressor, so as to keep the actual temperature in the freshness preservation space within the range between 0° C. and 10° C.

7. The refrigeration and freezing device according to claim 4, wherein the refrigeration and freezing device is an air-cooling refrigerator, an evaporator chamber for accommodating the evaporator is disposed inside the case body, an air duct from the evaporator chamber to the freshness preservation space is defined on the back of the liner, and an air door is disposed on the air duct to adjust a volume of cold air delivered to the freshness preservation space.

8. The refrigeration and freezing device according to claim 7, wherein the refrigeration system is further configured to adjust an operation state of the compressor and/or the opening or closing of the air door, so as to keep the actual temperature in the freshness preservation space within the range between 0° C. and 10° C.

9. The refrigeration and freezing device according to claim 4, wherein:

the storage container is a sealed drawer, and the sealed drawer defines the freshness preservation space; and the sealed drawer comprises: a drawer holder having a front opening and fixed at the liner, wherein the freshness preservation space is defined in the drawer holder; and a drawer body slidably mounted in the drawer holder so as to be operably pulled out or pushed in the drawer holder at the front opening of the drawer holder.

* * * * *